US009641222B2

(12) United States Patent
Yang et al.

(10) Patent No.: US 9,641,222 B2
(45) Date of Patent: May 2, 2017

(54) APPARATUS AND METHOD FOR MANAGING DEVICE OPERATION USING NEAR FIELD COMMUNICATION

(71) Applicant: SYMBOL TECHNOLOGIES, INC., Schaumburg, IL (US)

(72) Inventors: Tsung-Hsien Yang, Xindian (TW); Hughes Cheng, Taipei (TW); Ching-Rung Lee, New Taipei (TW); Michael A Tramontano, Franklin, MA (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/290,047

(22) Filed: May 29, 2014

(65) Prior Publication Data

US 2015/0349848 A1    Dec. 3, 2015

(51) Int. Cl.
*H04B 5/00*   (2006.01)
*H04W 76/02*   (2009.01)
*H04W 4/00*   (2009.01)
*H04W 4/02*   (2009.01)

(52) U.S. Cl.
CPC .......... *H04B 5/0031* (2013.01); *H04W 4/008* (2013.01); *H04W 4/023* (2013.01); *H04W 4/026* (2013.01); *H04W 76/023* (2013.01)

(58) Field of Classification Search
CPC ....... H04W 4/02; H04W 64/00; H04W 4/008; H04W 4/023; H04W 4/026; H04W 76/023; H04B 5/0031
USPC ............... 455/456.3, 41.1, 456.1, 41.2, 63.1; 715/48; 370/254, 329, 349; 345/633, 345/156, 174, 173; 719/320; 381/17, 79, 381/74
See application file for complete search history.

(56) References Cited

U.S. PATENT DOCUMENTS

| 8,180,285 | B2 |  | 5/2012 | Rofougaran |
| 8,457,651 | B2 |  | 6/2013 | Forutanpour |
| 8,494,502 | B2 |  | 7/2013 | Abel |
| 8,494,507 | B1 | * | 7/2013 | Tedesco et al. ............... 455/418 |
| 8,624,725 | B1 | * | 1/2014 | MacGregor .............. 340/539.13 |
| 8,674,958 | B1 | * | 3/2014 | Kravets et al. ............... 345/173 |
| 9,092,054 | B2 | * | 7/2015 | Poznansky et al. |
| 9,324,067 | B2 | * | 4/2016 | Van Os ................. G06Q 20/322 |
| 2005/0114015 | A1 | * | 5/2005 | Motoyama et al. ........... 701/207 |
| 2007/0054617 | A1 | * | 3/2007 | Nikolajevic et al. ........ 455/41.2 |
| 2008/0233971 | A1 | * | 9/2008 | Panabaker ............ G01S 5/0247 455/456.1 |
| 2009/0070721 | A1 | * | 3/2009 | Solomon ........................... 716/8 |
| 2009/0243959 | A1 | * | 10/2009 | Pering et al. .................. 345/1.3 |

(Continued)

OTHER PUBLICATIONS

International Search Report and Written Opinion mailed Sep. 11, 2015 in counterpart PCT application PCT/2015/032628.

*Primary Examiner* — Tan H Trinh (57) ABSTRACT

A device may include a memory for storing a set of instructions associated with at least one of an orientation and a position of the device. The device may also include a near field communication (NFC) transceiver for pairing the device with a second device. A processor in the device determines that the device is paired with the second device via the NFC transceiver; determines at least one of the orientation and the position of the device; and executes the set of instructions associated with at least one of the determined orientation and position of the device.

19 Claims, 9 Drawing Sheets

(56) References Cited

U.S. PATENT DOCUMENTS

| | | | |
|---|---|---|---|
| 2010/0068996 A1* | 3/2010 | Haartsen | H04B 5/0025 455/41.1 |
| 2010/0317332 A1* | 12/2010 | Bathiche et al. | 455/418 |
| 2011/0081923 A1 | 4/2011 | Forutanpour et al. | |
| 2011/0304648 A1* | 12/2011 | Kim | G06F 1/1626 345/633 |
| 2011/0314482 A1* | 12/2011 | Cupala et al. | 719/328 |
| 2012/0127015 A1* | 5/2012 | Weedon | G01S 13/781 342/38 |
| 2012/0137310 A1* | 5/2012 | Teruyama | H04W 4/00 719/320 |
| 2012/0198353 A1* | 8/2012 | Lee et al. | 715/748 |
| 2012/0220221 A1* | 8/2012 | Moosavi | H04M 1/274516 455/41.1 |
| 2012/0252359 A1* | 10/2012 | Adams | G06Q 20/3572 455/41.1 |
| 2012/0252360 A1* | 10/2012 | Adams | H04B 5/0062 455/41.1 |
| 2012/0315845 A1* | 12/2012 | Buczek | H04M 1/7253 455/41.1 |
| 2013/0029596 A1* | 1/2013 | Preston | H04L 63/18 455/41.1 |
| 2013/0045682 A1* | 2/2013 | Kang | H04B 5/0031 455/41.1 |
| 2013/0053007 A1* | 2/2013 | Cosman et al. | 455/414.3 |
| 2013/0072116 A1* | 3/2013 | Song | H04B 7/26 455/41.1 |
| 2013/0084800 A1* | 4/2013 | Troberg | H04B 5/0037 455/41.1 |
| 2013/0084801 A1* | 4/2013 | Royston | G06K 7/015 455/41.1 |
| 2013/0093713 A1* | 4/2013 | Bose | G01S 5/0072 345/174 |
| 2013/0223631 A1* | 8/2013 | Greuet | H04R 1/403 381/17 |
| 2013/0225077 A1* | 8/2013 | Schultz | H02J 7/025 455/41.1 |
| 2013/0225078 A1* | 8/2013 | Johansson | H04W 76/02 455/41.2 |
| 2013/0231889 A1* | 9/2013 | Hrybyk et al. | 702/141 |
| 2013/0238712 A1 | 9/2013 | Dearman | |
| 2013/0265241 A1* | 10/2013 | Thorn | G06F 3/011 345/173 |
| 2013/0309965 A1* | 11/2013 | Hillan | 455/41.1 |
| 2014/0025750 A1* | 1/2014 | Dawar et al. | 709/206 |
| 2014/0026188 A1* | 1/2014 | Gubler | H04W 12/08 726/3 |
| 2014/0137197 A1* | 5/2014 | Lazaridis | H04L 63/0492 726/3 |
| 2014/0141750 A1* | 5/2014 | Lazaridis | H04L 63/0492 455/411 |
| 2014/0187148 A1* | 7/2014 | Taite | H04M 1/7253 455/41.1 |
| 2014/0206288 A1* | 7/2014 | Liu | H04W 12/04 455/41.2 |
| 2014/0207662 A1* | 7/2014 | Isaacson | G06Q 20/342 705/39 |
| 2014/0375920 A1* | 12/2014 | Bae | G02F 1/136259 349/42 |
| 2015/0006376 A1* | 1/2015 | Nuthulapati | G06Q 20/341 705/41 |
| 2015/0070196 A1* | 3/2015 | Beaurepaire | 340/932.2 |
| 2015/0087231 A1* | 3/2015 | Sinha | H04W 4/008 455/41.2 |
| 2015/0163621 A1* | 6/2015 | Wang | H04W 4/008 455/41.3 |
| 2015/0173116 A1* | 6/2015 | Chiang | G06F 3/0488 455/41.1 |
| 2015/0193869 A1* | 7/2015 | Del Vecchio | G06Q 40/02 705/42 |
| 2015/0248664 A1* | 9/2015 | Makhdumi | G06Q 20/3274 235/380 |
| 2015/0305076 A1* | 10/2015 | Huang | H04W 4/008 455/41.1 |
| 2015/0348001 A1* | 12/2015 | Van Os | G06Q 20/40 705/44 |
| 2015/0348009 A1* | 12/2015 | Brown | G06Q 20/3227 705/16 |
| 2015/0348029 A1* | 12/2015 | Van Os | G06Q 20/40 705/44 |
| 2016/0088449 A1* | 3/2016 | Sharma | H04W 4/12 455/426.1 |
| 2016/0224966 A1* | 8/2016 | Van Os | G06Q 20/24 705/39 |

* cited by examiner

APPARATUS AND METHOD FOR MANAGING DEVICE OPERATION USING NEAR FIELD COMMUNICATION

BACKGROUND OF THE INVENTION

Near field communication (NFC) represents a set of short-range wireless standards for establishing radio communications between two communication devices within proximity of each other. Using electromagnetic radio fields, NFC allows two NFC-enabled devices to exchange information with each other without going through multiple connection procedures or alternatively physically connecting to each other.

Devices using NFC may be active or passive. A passive device, such as an NFC tag, contains information that other devices may read but the passive device does not read any information itself. Active devices may read and/or transmit information. Accordingly, an active NFC device may collect information from other active devices and/or from passive devices such as NFC tags and the active NFC device may also exchange information with other compatible devices.

As NFC utilization grows, there is a need for an apparatus and method for managing device operation using near field communication.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to managing device operation using near field communication (NFC). A device may include a memory for storing a set of instructions associated with at least one of an orientation and a position of the device. The device may also include a NFC transceiver for pairing the device with a second device. A processor in the device determines that the device is paired with the second device via the NFC transceiver; determines at least one of the orientation and the position of the device; and executes the set of instructions associated with at least one of the determined orientation and position of the device.

Figure 1:
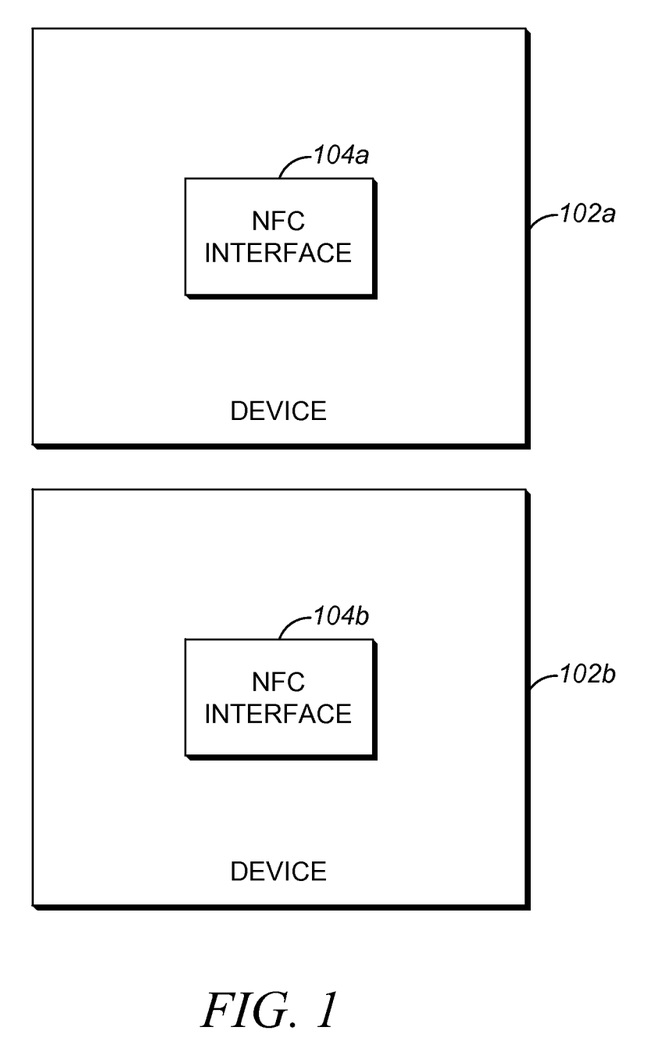
FIG. 1 is a block diagram of a system including devices used in accordance with some embodiments.

FIG. 1 is a block diagram of a system including devices used in accordance with some embodiments. Each device 102 (i.e., devices 102a and 102b) may include a near field communication (NFC) interface 104 (i.e., NFC interface 104a and 104b) to enable the device to support NFC pairing. Each device 102 may be an active NFC-enabled device (also referred to herein as an active device) or a passive NFC-enabled device (also referred to herein as a passive device). Passive devices may be, for example, radio frequency identifier (RFID) tags or equivalent devices that can send information to other NFC-enabled devices, without needing its own power source. Typically, passive devices cannot process information sent from other NFC-enabled devices and cannot connect to other passive devices. Active devices may be, for example, mobile devices or stationary devices such as mobile telephones, personal data assistants (PDAs), smartphones, tablets, printers, computers, card readers, touch payment terminals or equivalent devices that can both send and receive data and that can communicate with active devices and passive devices.

During a pairing process, when the separation between two devices 102 (for example, device 102a and 102b) being paired is within a predefined distance, devices 102a and 102b may establish radio communication. For example, each of devices 102a and 102b may use its NFC interface 104 to establish the radio communication when devices 102a and 102b are tapped to each other (i.e., when the devices are within a predefined proximity of each other) and devices 102a and 102b may exchange information via the NFC interface. In addition to the devices being paired via NFC, the devices may also be paired via another pairing protocol, for example, Bluetooth, and the device may exchange information via the other pairing protocol. Consider for example that device 102a is an active device and device 102b is a passive device. When devices 102a and 102b establish the radio communication (also referred to herein as the devices being tapped), active device 102a induces electric current within passive device 102b, causing passive device 102b to send data to active device 102a. In this case, passive device 102b may not require its own power supply and can instead be powered by the electromagnetic field produced by active device 102a.

Subsequent to being tapped using NFC interface 104, paired devices may operate in one of a peer-to-peer mode, a read/write mode and a card emulation mode. In the peer-to-peer mode, the paired devices may exchange information, wherein in this mode both devices may be active devices and the devices may switch between being active, when sending data, and being passive when receiving data. In the read/write mode, an active device may pair with a passive device to retrieve information from the passive device. In the card emulation mode, one of the paired devices may function like a smart or contactless credit card and may be configured to transmit information or "tap into", for example, a card reader.

Figure 2:
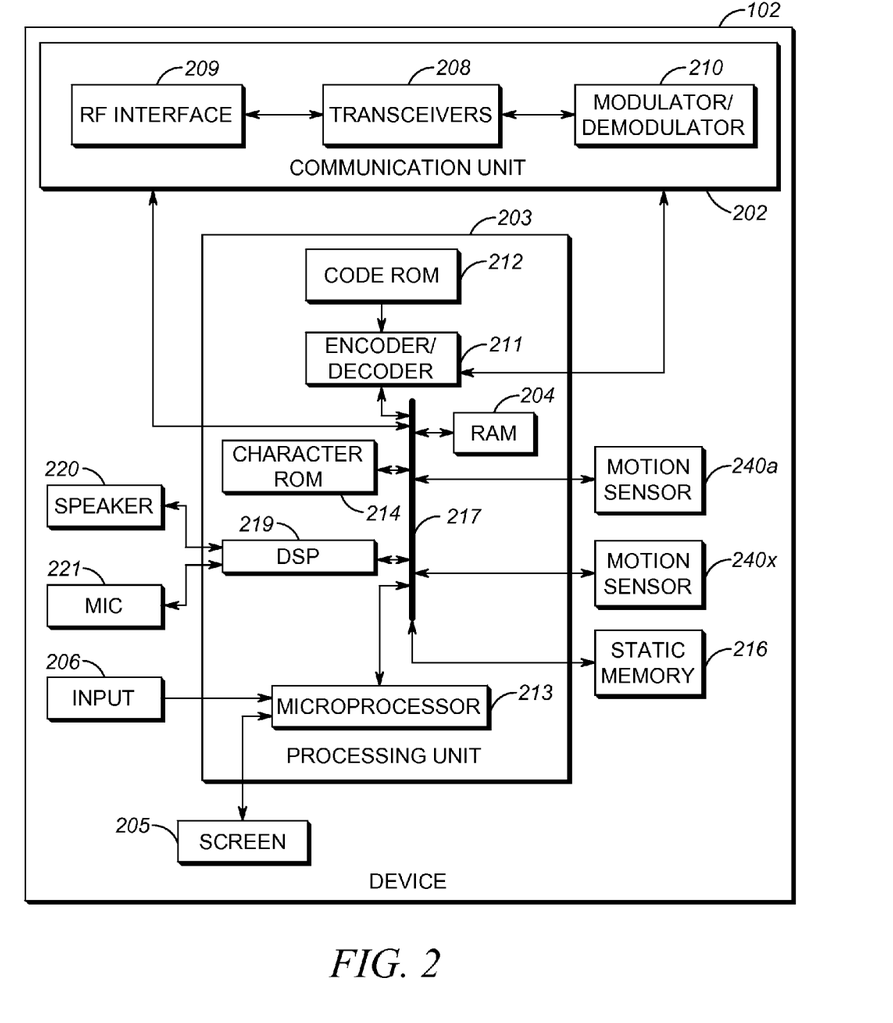
FIG. 2 is a block diagram of an active device used in accordance with some embodiments.

FIG. 2 is a block diagram of an active device used in accordance with some embodiments. Device 102 may include a communications unit 202 coupled to a common data and address bus 217 of a processing unit 203. Device 102 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203.

Processing unit 203 may include an encoder/decoder 211 with an associated code read-only memory (ROM) 212 for storing data for encoding and decoding voice, data, control, or other signals that may be transmitted or received by device 102. Processing unit 203 may further include a microprocessor 213 coupled, by the common data and address bus 217, to the encoder/decoder 211, a character ROM 214, a random access memory (RAM) 204, and a static memory 216. Processing unit 203 may also include a digital signal processor (DSP) 219, coupled to the speaker 220, the microphone 221, and the common data and address bus 217, for operating on audio signals received from one or more of the communications unit 202, the static memory 216, and the microphone 221.

Device 102 may also include one or more motion sensors 240 (i.e., sensors 240*a* and 240*x*). Non limiting examples of motion sensors 240 may include an accelerometer, an e-Compass, a gyroscope or an equivalent sensor that can detect an orientation, position and/or movement of device 102. Each motion sensor 240 is coupled to a processing unit 203 and may generate a sensor signal indicating the orientation, position and/or movement of the device 102.

Communications unit 202 may include a radio frequency (RF) interface 209 configurable to communicate with network components, and other user equipment within its communication range. Communications unit 202 may include one or more broadband and/or narrowband transceivers 208, such as a NFC transceiver, a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. For any IEEE standards recited herein, contact the IEEE at IEEE, 445 Hoes Lane, PO Box 1331, Piscataway, N.J. 08855-1331, USA. The transceivers may be coupled to a combined modulator/demodulator 210 that is coupled to the encoder/decoder 211.

The character ROM 214 may store code for decoding or encoding data such as control, request, or instruction messages, channel change messages, and/or data or voice messages that may be transmitted or received by device 102. Static memory 216 may store instructions that are to be executed based on a specific orientation, position and/or movement of the device 102. For example, static memory 216 may store instructions that are to be executed when the front of device 102 is determined to be oriented towards the front of a second device paired with device 102 via it NFC interface, instructions that are to be executed when the back of device 102 is determined to be oriented towards the back of the second device paired with device 102 via it NFC interface, instructions that are to be executed when a predefined side (for example, the right side) of device 102 is determined to be oriented towards a predefined side of the second device paired with device 102 via it NFC interface, or instructions that are to be executed when a predefined angle (for example, a ninety degree angle) of device 102 is determined to be oriented towards the a predefined angle of the second device paired with device 102 via it NFC interface. Static memory 216 may also store the operating code for performing one or more of the steps set forth in FIG. 5.

When device 102 is paired with another device (for example, device 102*b* as shown in FIG. 1, device 300 as shown in FIG. 3 or device 400 as shown in FIG. 4) via its NFC interface, processing unit 203 determines the orientation and the position of the device 102. The determined orientation and position may also take into account the movement of device 102. For example, processing unit 203 may obtain a signal provided by one or more sensors 240 to determine the orientation and the position of the device 102 along one or more of the x axis, y-axis and z axis and/or at a predefined angle. Processing unit 203 may then use the determined orientation and/or position of the device 102 to execute an operation that is associated with the determined orientation and/or position of device 102. For example, processing unit 203 may access a table stored in static memory 216, wherein the table may store an operation associated with each predetermined orientation and position of device 102. The table may be preprogrammed, user-programmed and/or enterprise programmed.

Consider for example that the table in static memory 216 includes instructions that indicate that device 102 is to join a group of devices if the front of device 102 is facing the front of a second device paired with device 102 via its NFC interface. When processing unit 203 obtains a signal indicating that the front of device 102 is facing the front of the second device and that device 102 is paired with the second device via its NFC interface, processing unit 203 may execute the instructions to have device 102 join the group of devices. Consider another example where the table in static memory 216 includes instructions that indicate that device 102 is to disconnect from the group of devices if the back of device 102 is facing the back of the second device paired with device 102 via its NFC interface. When processing unit 203 obtains a signal indicating that the back of device 102 is facing the back of the second device and that device 102 is paired with the second device via its NFC interface, processing unit 203 may execute instructions to have device 102 disconnect the group of devices. Accordingly, based on the determined orientation and/or position of device 102, processing unit 203 may execute a specific operation that is associated with the determined orientation and/or position of device 102.

FIG. 3A through FIG. 3F illustrate devices paired via a near field communication interface such that a set of instructions is executed on the paired devices according to the orientation and/or position of the devices in accordance with some embodiments. Each of the devices (i.e., device 102 and device 300) in FIG. 3A through FIG. 3F is an active device, for example, a smart phone. During a pairing process, the processing unit in each of the devices being paired determines the orientation and/or position of the device based on one or more signals generated by one or more motion sensors in the device. The processing unit may transmit the determined orientation and/or position to the other device. The processing unit on each device may also execute a set of predefined instructions associated with its determined orientation and/or position and the orientation and/or position information received from the other device. The associated instructions and orientation and/or position shown in FIG. 3A through FIG. 3F and described below are provided only to show examples. Other instructions may be associated with the orientation and/or position described and shown in FIG. 3A through FIG. 3F.

Figure 3A:
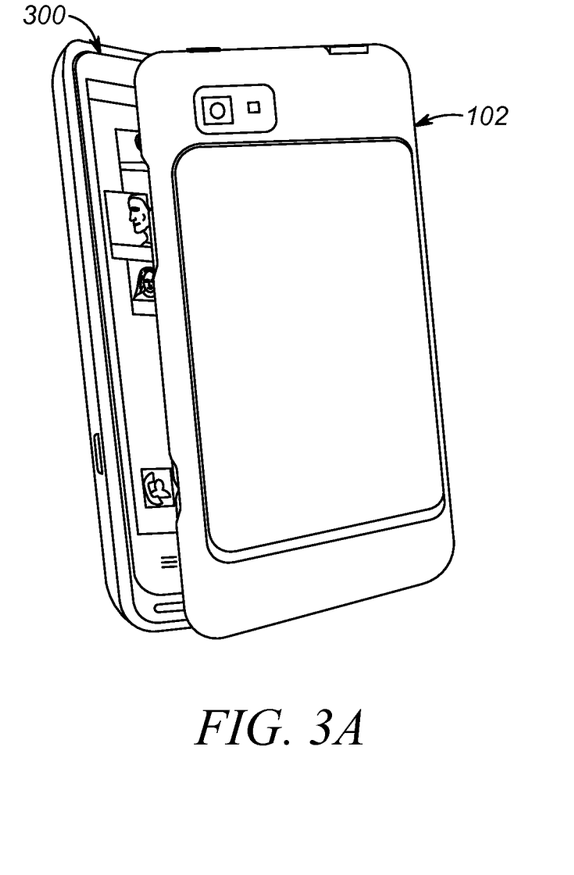
FIG. 3A through FIG. 3F illustrate devices paired via a near field communication interface such that a set of instructions is executed on the paired devices according to the orientations, positions and/or movements of the devices in accordance with some embodiments.

FIG. 3A illustrates a non-limiting example where the processing unit in device 102 may obtain instructions that indicate that device 102 is to join a group of devices if the front of device 102 is facing the front of device 300 when device 102 is paired with device 300 via its NFC interface. Other operations may be associated with this device orientation. As such, the association of this orientation with the operation of joining a group of devices is only provided as a non-limiting example. Using the instructions associated with front-to-front orientation and NFC pairing, when the processing unit in device 102 determines, based on one or more signals generated by one or more motion sensors in device 102 and/or based on information received from device 300, that the front of device 102 is facing the front of device 300 and that device 102 is paired with device 300 via its NFC interface, the processing unit in device 102 may execute instructions to have device 102 join the group of devices.

In another non-limiting example, the processing unit in device 102 may obtain instructions that indicate that device 102 is to be paired with device 300 via, for example, Bluetooth, if the front of device 102 is facing the front of device 300 when device 102 is paired with device 300 via its NFC interface. In this example, using the instructions associated with front-to-front orientation and NFC pairing, when the processing unit in device 102 determines, based on one or more signals generated by one or more motion sensors in device 102 and/or based on information received from device 300, that the front of device 102 is facing the front of device 300 and that device 102 is paired with device 300 via its NFC interface, the processing unit in device 102 may execute instructions to have device 102 paired with device 300 via Bluetooth.

Figure 3B:
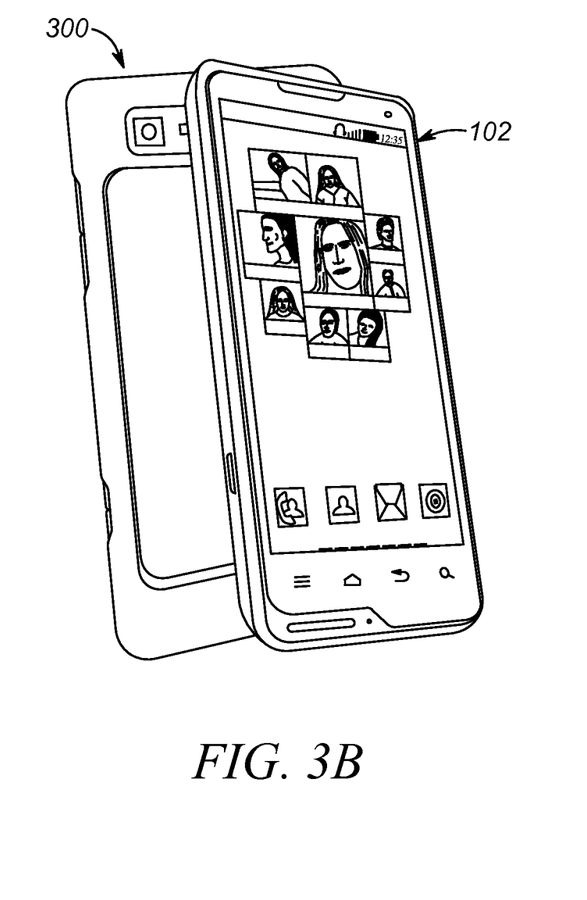

FIG. 3B illustrates a non-limiting example where the processing unit in device 102 may obtain instructions that indicate that device 102 is to disconnect from the group of devices if the back of device 102 is facing the back of device 300 when device 102 is paired with device 300 via its NFC interface. Other operations may be associated with this device orientation. As such, the association of this orientation with the operation of disconnecting from the group of devices is only provided as a non-limiting example. Using the instructions associated with back-to-back orientation and NFC pairing, when the processing unit in device 102 determines, based on one or more signals generated by one or more motion sensors in device 102 and/or based on information received from device 300, that the back of device 102 is facing the back of device 300 and that device 102 is paired with device 300 via its NFC interface, the processing unit in device 102 may execute instructions to have device 102 disconnect from the group of devices.

In another non-limiting example, the processing unit in device 102 may obtain instructions that indicate that device 102 is to be unpaired from device 300 via, for example, Bluetooth, if the back of device 102 is facing the back of device 300 when device 102 is paired with device 300 via its NFC interface. In this example, using the instructions associated with back-to-back orientation and NFC pairing, when the processing unit in device 102 determines, based on one or more signals generated by one or more motion sensors in device 102 and/or based on information received from device 300, that the back of device 102 is facing the back of device 300 and that device 102 is paired with device 300 via its NFC interface, the processing unit in device 102 may execute instructions to have device 102 unpaired from device 300 via Bluetooth.

Figure 3C:
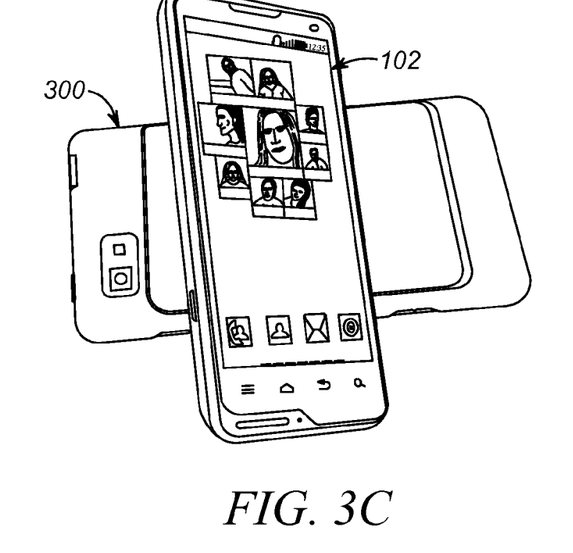

FIG. 3C illustrates a non-limiting example where the processing unit in device 102 may obtain instructions that indicate that processing unit is to lock device 102 if the back of device 102 is rotated to the right when the back of device 102 is facing the back of device 300 when device 300 is in a horizontal position and when device 102 is paired with device 300 via its NFC interface. Other operations may be associated with this device orientation. As such, the association of this orientation with the operation of locking device 102 is only provided as a non-limiting example. Using the instructions associated with right rotation, back-to-back orientation and NFC pairing, when the processing unit in device 102 determines, based on one or more signals generated by one or more motion sensors in device 102 and/or based on information received from device 300, that device 102 is rotated to the right when the back of device 102 is facing the back of device 300 when device 300 is in a horizontal position and that device 102 is paired with device 300 via its NFC interface, the processing unit in device 102 may execute instructions to lock the display on device 102.

Figure 3D:
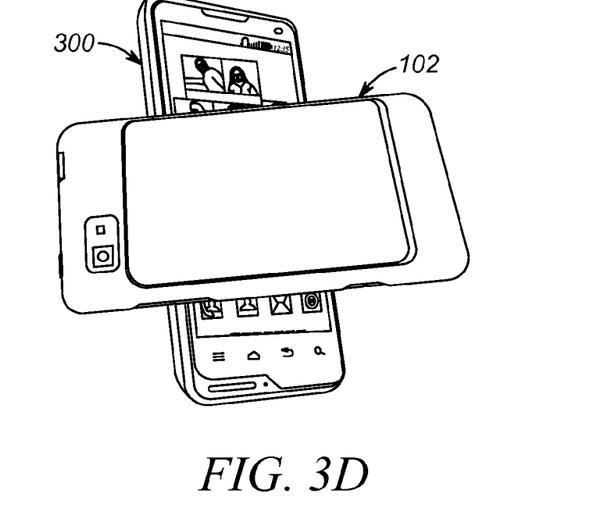

FIG. 3D illustrates a non-limiting example the processing unit in device 102 may obtain instructions that indicate that the processing unit is to unlock device 102 if device 102 is in a horizontal position and device 300 is in a vertical position and the front of device 102 is facing the front of device 300 when device 102 is paired with device 300 via its NFC interface. Other operations may be associated with this device orientation. As such, the association of this orientation with the operation of unlocking device 102 is only provided as a non-limiting example. Using the instructions associated with the horizontal/vertical positions, front-to-front orientation and NFC pairing, when the processing unit in device 102 determines, based on one or more signals generated by one or more motion sensors in device 102 and/or based on information received from device 300, that device 102 is in a horizontal position and device 300 is in a vertical position and the front of device 102 is facing the front of device 300 and that device 102 is paired with device 300 via its NFC interface, the processing unit in device 102 may execute instructions to unlock the display on device 102.

Figure 3E:
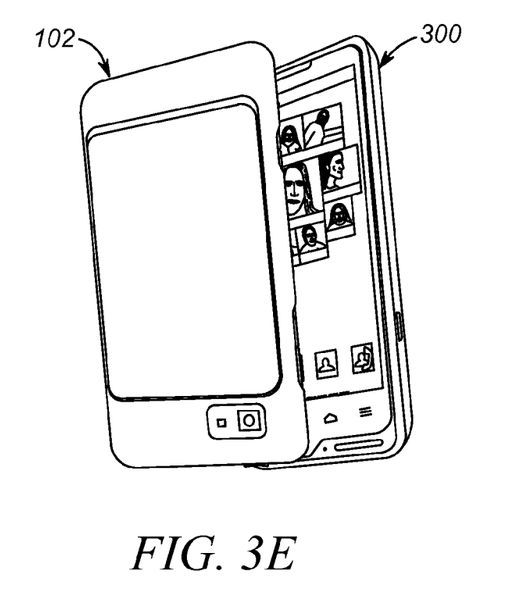

FIG. 3E illustrates a non-limiting example where the processing unit in device 102 may obtain instructions that indicate that the processing unit is to transmit predefined information from device 102 if device 102 is positioned upside down and the front of device 102 is facing the front of device 300 when device 102 is paired with device 300 via its NFC interface. Other operations may be associated with this device orientation. As such, the association of this orientation with the operation of transmitting predefined information from device 102 is only provided as a non-limiting example. Using the instructions associated with the upside down positions, front-to-front orientation and NFC pairing, when the processing unit in device 102 determines, based on one or more signals generated by one or more motion sensors in device 102 and/or based on information received from device 300, that device 102 is positioned upside down and the front of device 102 is facing the front of device 300 and that device 102 is paired with device 300 via its NFC interface, the processing unit in device 102 may execute instructions to transmit the predefined information on device 102.

Figure 3F:
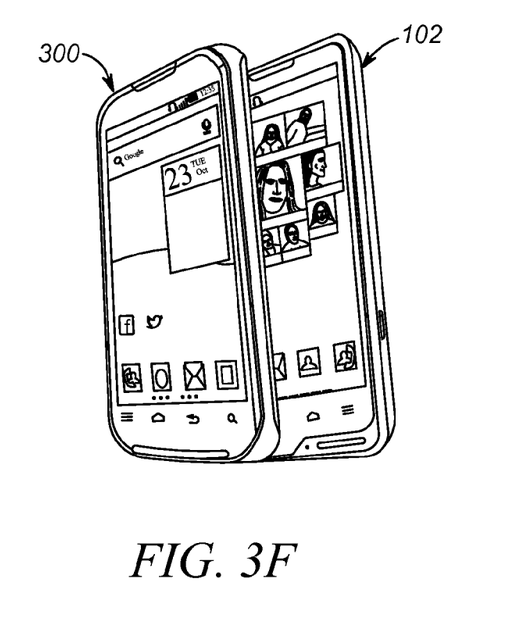

FIG. 3F illustrates another non-limiting example where the processing unit in device 102 may obtain instructions that indicate that the processing unit is to transmit predefined information from device 102 if the front of device 102 is facing the back of device 300 when device 102 is paired with device 300 via its NFC interface. Other operations may be associated with this device orientation. As such, the association of this orientation with the operation of transmitting predefined information from device 102 is only provided as a non-limiting example. Using the instructions associated with the front-to-back orientation and NFC pairing, when the processing unit in device 102 determines, based on one or more signals generated by one or more motion sensors in device 102 and/or based on information received from device 300, that the front of device 102 is facing the back of device 300 and that device 102 is paired with device 300 via its NFC interface, the processing unit in device 102 may execute instructions to transmit the predefined information on device 102.

Accordingly, using the information obtained from one or more motion sensors regarding the orientations (for example, horizontal, and vertical), positions (for example, up-side down, clockwise 90 degrees, front to back) and/or movements (for example, rotated right, rotated left, rotated upwards or rotated downwards) of the devices being paired, the processing units in the devices being paired may determine the orientation, position and/or movement of each device being paired and may execute a specific operation that is associated with the determined orientation, position and/or movement. The processing unit may provide a visual display of the operation being executed based on the orientation, position and/or movement of the device and NFC pairing.

Figure 4A:
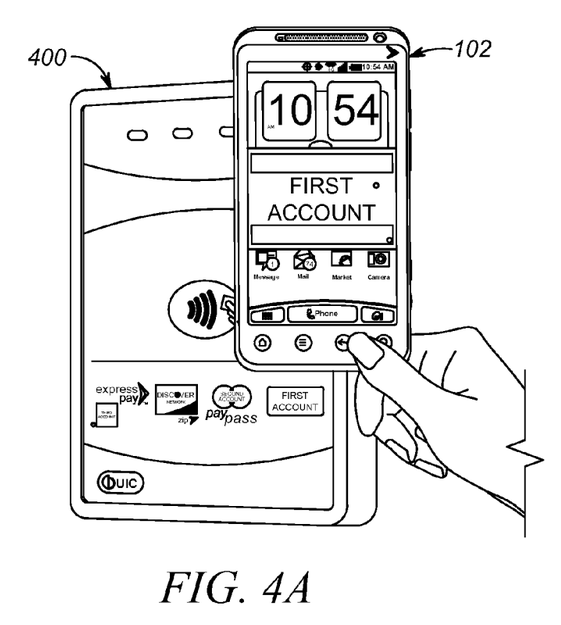
FIG. 4A through 4C illustrate visual displays of devices with specific orientations in accordance with some embodiments.
Figure 4B:
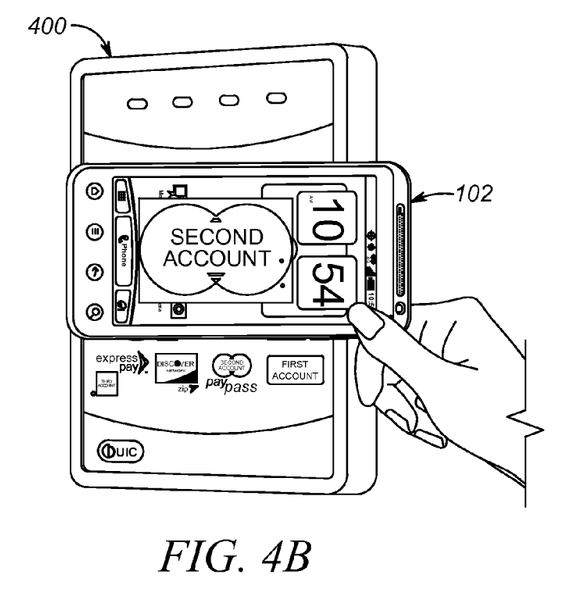
Figure 4C:
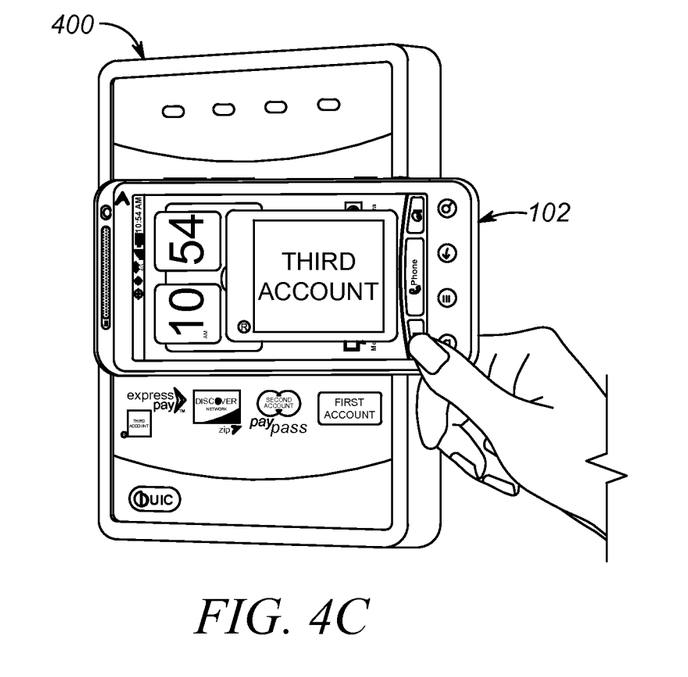

FIG. 4A through FIG. 4C illustrate visual displays of devices with specific orientations in accordance with some embodiments. Each of the operations being carried out on a device may be displayed on the device. For example, each of the operations carried out on the devices in FIG. 3A through FIG. 3F may be displayed on the devices. FIG. 4A through FIG. 4C provide examples of the visual displays of devices (for example, a payment terminal shown as device 400 and a smart phone shown as device 102) with specific orientations, wherein each of the visual displays of FIG. 4A through FIG. 4C indicate a kind of payment operation that is to be executed on the paired devices.

FIG. 4A illustrates an example where the processing unit in device 102 may obtain instructions that indicate that the processing unit is to transmit payment from a first account and from device 102 (shown as a smart phone) if the back of device 102 is facing the front of device 400 (shown as a payment terminal) when device 102 is paired with device 400 via its NFC interface. Using the instructions associated with the back-to-front orientation and NFC pairing, when the processing unit in device 102 determines, based on one or more signals generated by one or more motion sensors in device 102 and/or based on information received from device 400, that the back of device 102 is facing the front of device 400 and that device 102 is paired with device 400 via its NFC interface, the processing unit in device 102 may display instructions to transmit payment information from the first account and from device 102 and may execute the displayed instructions.

FIG. 4B illustrates an example where the processing unit in device 102 may obtain instructions that indicate that the processing unit is to transmit payment from a second account from device 102 if the back of device 102 is facing the front of device 400 and device 102 is positioned in a horizontal position with the top of device 102 positioned to the right side of device 400 when device 102 is being paired with device 400 via its NFC interface. Using the instructions associated with the back-to-front orientation, horizontal and right side positioning, and NFC pairing, when the processing unit in device 102 determines, based on one or more signals generated by one or more motion sensors in device 102 and/or based on information received from device 400, that the back of device 102 is facing the front of device 400, that device 102 is positioned in a horizontal position with the top of device 102 on the right side of device 400 and that device 102 is paired with device 400 via its NFC interface, the processing unit in device 102 may display instructions to transmit payment information from device 102 and from the second account and execute the displayed information.

FIG. 4C illustrates an example where the processing unit in device 102 may obtain instructions that indicate that the processing unit is to transmit payment from a third account from device 102 if the back of device 102 is facing the front of device 400 and device 102 is positioned in a horizontal position with the top of device 102 positioned to the left side of device 400 when device 102 is paired with device 400 via its NFC interface. Using the instructions associated with the back-to-front orientation, horizontal and left side positioning, and NFC pairing, when the processing unit in device 102 determines, based on one or more signals generated by one or more motion sensors in device 102 and/or based on information received from device 300, that the back of device 102 is facing the front of device 400, that device 102 is positioned in a horizontal position with the top of device 102 on the left side of device 400 and that device 102 is paired with device 400 via its NFC interface, the processing unit in device 102 may display instructions to transmit payment information from device 102 and from the third account and execute the displayed information.

Figure 5:
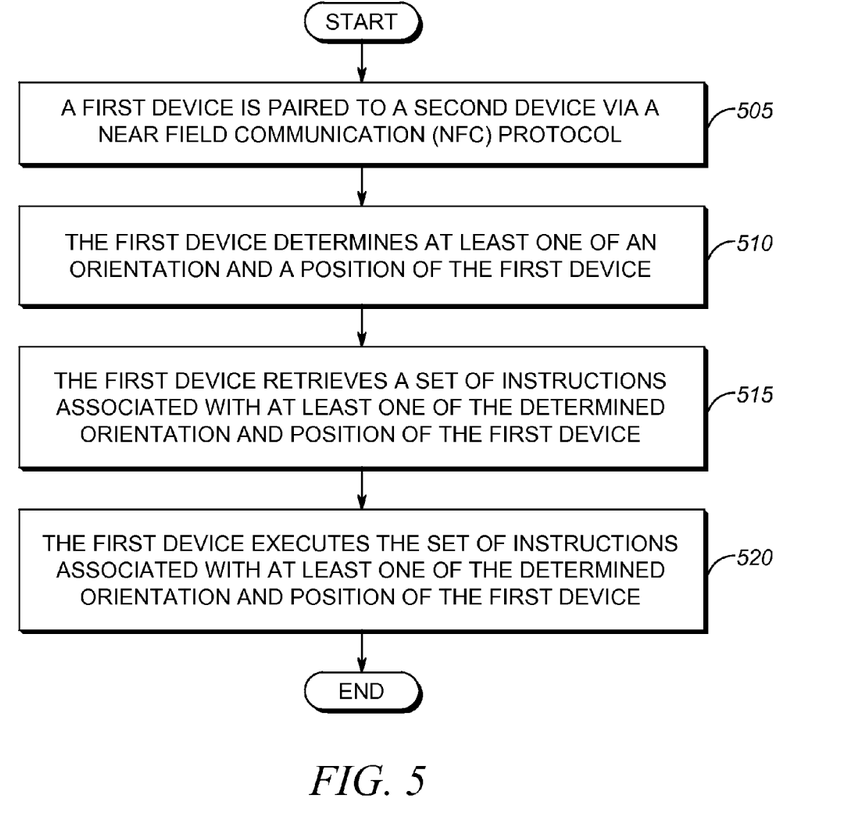
FIG. 5 is a flow diagram of a method implemented in accordance with some embodiments.

FIG. 5 illustrates a flowchart of a method in accordance with some embodiments. At 505, a first device is paired to a second device via a near field communication (NFC) protocol. At 510, the first device determines at least one of an orientation and a position of the first device. At 515, the first device retrieves a set of instructions associated with at least one of the determined orientation and position of the first device. At 520, the first device executes the set of instructions associated with at least one of the determined orientation and position of the first device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A device, comprising:
   a memory operating to store a set of instructions to modify an operational parameter of the device associated with an orientation and a position of the device with respect to an orientation and a position of a second device;
   a transceiver operating to pair the device with the second device;
   a processor operating to:
      determine that the device is paired with the second device via the transceiver;
      determine the orientation and the position of the device with respect to the orientation and the position of the second device;
      access the set of instructions stored in the memory; and
      execute the set of instructions to modify the operational parameter of the device associated with the determined orientation and position of the device with respect to the orientation and the position of the second device,
         wherein the operational parameter comprises a selection of a payment account for a payment operation among a plurality of payment accounts associated with the device.

2. The device of claim 1, wherein the processor determines at least one of the orientation and the position of the device based on a signal generated by at least one motion sensor in the device.

3. The device of claim 1, wherein the processor determines at least one of the orientation and the position of the device based on a signal received from the second device.

4. The device of claim 1, wherein the operational parameter further comprises at least one of a connection status of the device and a lock status of the device.

5. The device of claim 1, wherein at least one of the determined orientation and position of the device is at a predefined angle.

6. The device of claim 1, wherein the processor transmits at least one of the determined orientation and position of the device to the second device.

7. A system, comprising;
   a first device and a second device paired via a communication protocol, wherein at least one of the first device and the second device:
      determines an orientation and a position of at least one of the first device and the second device;
      retrieves a set of instructions to modify an operational parameter of at least one of the first device and the second device associated with the determined orientation and position of at least one of the first device and the second device; and
      executes the set of instructions to modify the operational parameter of at least one of the first device and the second device associated with the determined orientation and position of at least one of the first device and the second device,
         wherein the operational parameter comprises a selection of a payment account for a payment operation among a plurality of predetermined payment accounts.

8. The system of claim 7, wherein the first device determines at least one of the orientation and the position of the first device based on a signal generated by at least one motion sensor in the first device.

9. The system of claim 7, wherein the first device determines at least one of the orientation and the position of the second device based on a signal received from the second device.

10. The system of claim 7, wherein the first device:
receives information indicating at least one of the orientation and the position of the second device; and
determines at least one of the orientation and the position of the first device in relation to at least one of the orientation and the position of the second device.

11. The system of claim 7, wherein the operational parameter further comprises at least one of a connection status and a lock status of at least one of the first device and the second device.

12. The system of claim 7, wherein the first device determines at least one of the orientation and the position of the first device at a predefined angle.

13. The system of claim 7, wherein the first device transmits least one of the determined orientation and position of the first device to the second device.

14. A method, comprising:
pairing a first device and a second device via a communication protocol;
determining, by the first device, an orientation and a position of the first device;
retrieving, by the first device, a set of instructions to modify an operational parameter of the first device associated with the determined orientation and the position of the first device; and
executing, by the first device, the set of instructions to modify the operational parameter of the first device associated with the determined orientation and the position of the first device,
wherein the operational parameter comprises a selection of a payment account for a payment operation among a plurality of payment accounts associated with the first device.

15. The method of claim 14, further comprising determining, by the first device, at least one of the orientation and the position of the first device based on a signal generated by at least one motion sensor in the first device.

16. The method of claim 14, further comprising determining, by the first device, at least one of the orientation and the position of the first device based on a signal received from the second device.

17. The method of claim 14, further comprising:
receiving, by the first device, information indicating at least one of an orientation and a position of the second device; and
determining, by the first device, at least one of the orientation and the position of the first device in relation to at least one of the orientation and the position of the second device.

18. The method of claim 14, wherein the operational parameter further comprises at least one of a connection status and a lock status of the first device.

19. The method of claim 14, further comprising transmitting, by the first device, least one of the determined orientation and the position of the first device to the second device.

* * * * *